US012793522B2

(12) United States Patent
Green Mullins

(10) Patent No.: US 12,793,522 B2
(45) Date of Patent: Nov. 10, 2026

(54) DECIBEL ALARM SYSTEM

(71) Applicant: Sherry Green Mullins, Jasper, GA (US)

(72) Inventor: Sherry Green Mullins, Jasper, GA (US)

( * ) Notice: Subject to any disclaimer, the term of this patent is extended or adjusted under 35 U.S.C. 154(b) by 0 days.

(21) Appl. No.: 18/887,816

(22) Filed: Sep. 17, 2024

(65) Prior Publication Data

US 2025/0014437 A1 Jan. 9, 2025

Related U.S. Application Data

(63) Continuation of application No. 17/973,786, filed on Oct. 26, 2022, now Pat. No. 12,125,354.

(51) Int. Cl.
*G08B 13/16* (2006.01)

(52) U.S. Cl.
CPC ................................ *G08B 13/1672* (2013.01)

(58) Field of Classification Search
CPC ........................ G08B 13/1672; B60R 25/1009
See application file for complete search history.

(56) References Cited

U.S. PATENT DOCUMENTS 3,158,850 A 11/1964 Poznanski
4,700,332 A * 10/1987 Hwang .............. G08B 13/1654 367/136
5,504,717 A * 4/1996 Sharkey .................. G01S 3/801 367/129
5,742,232 A * 4/1998 Kurahashi .............. G08B 13/04 340/541
5,877,684 A * 3/1999 Lu .......................... G08B 13/19 340/541
6,359,558 B1 3/2002 Tsui
2002/0027502 A1 3/2002 Mayor
2006/0012478 A1 * 1/2006 Carmichel ............... G08B 3/10 340/552
2012/0086570 A1 * 4/2012 Gancarcik ............ G08B 25/001 340/533
2015/0279181 A1 * 10/2015 Park ................... G08B 13/1672 367/136
2015/0296187 A1 10/2015 Baldwin
2017/0309142 A1 * 10/2017 Phillips .............. G08B 13/1672
2018/0074034 A1 3/2018 Jones et al.

(Continued)

FOREIGN PATENT DOCUMENTS

CN 101213589 7/2008
GB 2274189 7/1994
WO 9636949 11/1996

*Primary Examiner* — Nay Tun
(74) *Attorney, Agent, or Firm* — David O. Simmons

(57) ABSTRACT

A device directed to providing for a means for a security or alarm system to detect a measured deviation in the ambient decibel level in the monitored area indicating that vehicles or equipment are being cranked and started at a time when they should not be. The measurement of a predetermined variance in the decibel level can invoke notifications, sirens and the video taping of the area in order to deter the theft. This invention may be an option added to any existing security system as an article of intermediate manufacture. In addition to decibel level detector feature, each vehicle's running engine sound can be loaded into the security system which, similar to a voice recognition system, allows the security system to identify which vehicle is being started.

18 Claims, 7 Drawing Sheets

(56) References Cited

U.S. PATENT DOCUMENTS

| | | | | |
|---|---|---|---|---|
| 2020/0143838 | A1 | 5/2020 | Peleg et al. | |
| 2020/0380835 | A1 | 12/2020 | Simpson et al. | |
| 2021/0027602 | A1 | 1/2021 | Correnti | |
| 2022/0270453 | A1* | 8/2022 | Werner .................. | G08B 13/04 |
| 2024/0284155 | A1* | 8/2024 | Lee ........................ | G08B 25/10 |

* cited by examiner

DECIBEL ALARM SYSTEM

RELATED APPLICATIONS

This application is a continuation of co-pending application U.S. Ser. No. 17/973,786 filed on Oct. 26, 2022, entitled, Decibel Alarm System.

FIELD OF THE INVENTION

This invention is directed to an alarm system based on a deviation in decibel levels. More particularly, using a sound generated noise signal from a running engine, preferably a diesel engine, in proximity to sensors of the alarm system.

BACKGROUND OF THE INVENTION

It is well known that theft is at an all-time high. Thieves have learned how to outsmart security systems even tracking devices. By the time the owner can locate the last "ping" from a tracking device, the stolen item is already on a container on the ocean headed to parts unknown where it is cost prohibitive to even attempt to recover the stolen items. This results in a costly insurance claim and an increase in premiums along with an excessive replacement cost of the stolen items which surely will not be covered by even the best replacement policy. Even if it is covered, the victim of the theft incurs exorbitant increases in the insurance rates. It is, therefore, increasingly important to prevent the theft.

It is well known that theft of equipment and vehicles from construction sites, shops, offices, homes or business locations is predominant and increasing. Security Systems are at an all-time high. However, existing security systems can only detect motion, doors or windows opening or glass breaks. The notifications from motion sensing become monotonous due to birds, insects, lights from passing vehicles, etc. It causes the user to become jaded to the meaningless notifications which works to the benefit of thieves. However, if security systems could be more catered to the specific location based on a deviation in decibel levels, they could be more effective in the deterrence and or prevention of theft particularly costly theft of vehicles or equipment.

A Decibel Level Detector can be very instrumental in accomplishing just that. Therefore, there exists a need for a solution which shall provide a means to detect an increase in the decibel level in the area which can help stop the theft of items and possibly obtain video images of those responsible for the attempted theft. This can be an optional item incorporated in any security system as an article of intermediate manufacture. In combination with a decibel level detector a sound recognition feature can be incorporated which can identify a sound recognition signature of a specific vehicle which can be triggered by the starting of the vehicle's engine. Much like voice recognition software which can identify a person's voice pattern, every vehicle engine has a similar unique noise pattern that can be identified and pre-loaded into a security system to alert a vehicle owner when his vehicle engine is running and emitting its specific engine noise pattern. This and other features are described hereinafter.

SUMMARY OF THE INVENTION

This invention is directed to providing for a means for a security or alarm system to detect a measured deviation in the ambient decibel level in the monitored area indicating that vehicles or equipment are being cranked and started at a time when they should not be. The measurement of a predetermined variance in the decibel level can invoke notifications, sirens and the video taping of the area in order to deter the theft. This invention may be an option added to any existing security system as an article of intermediate manufacture. In addition to decibel level detector feature, each vehicle's running engine sound can be loaded into the security system which, similar to a voice recognition system, allows the security system to identify which vehicle is being started. If the vehicle detected is not identified, this means an unauthorized vehicle is on the site at a time when it should not be. The system using a decibel level alarm from a running engine is ideal for diesel engines used in virtually all construction equipment.

This invention is directed to the deterrence of the theft of vehicles and equipment from homes, shops, offices and/or job sites which can be preempted by the detection of a variance in the ambient decibel level at a location caused by the cranking of a vehicle or machine which creates an increase in the decibel level at the site.

The system provides a Decibel Level Detector (dBA) Device which can read the ambient Decibel Level of a specific location at specified times, then recognize a substantial increase in the Decibel Level at those specified times as set by the user. The increase can be determined by the user. For example: a job site/shop after working hours may have an ambient dBA level of 40 or 50 which may be used as the base level for a secure job site/shop. If the user sets the increased decibel level at 20+ dBA, then, after hours, if a diesel truck cranks at a level of 80 dBA or an excavator cranks at a level of 87 dBA, the Decibel Level Detector would send an alert to the indicated recipients. That is, the dBA Detector can be instructed to send an alert if there is an increase of 10+, 15+, 20+, 25+, 30+ or more decibels which would indicate a security breach. The system can be set up to automatically begin recording, send alerts, sound an alarm or siren to deter theft, etc.

Parameters for this feature include, activation if levels are greater than 70 dB, sustained for five seconds or longer. The user can adjust the sensitivity to make it more or less sensitive.

In one embodiment, the alarm system is pre-loaded with specific sound signatures of each engine. The detection of that engine cranking will identify which vehicle engine is running and its location on the site will allow the alarm system to illuminate that vehicle and direct security to it immediately. This feature is very helpful on large job sites with many vehicles spread out over the area.

BRIEF DESCRIPTION OF THE DRAWINGS

The accompanying drawings, which are incorporated in and form a part of the specification, illustrate embodiments of the presently disclosed invention and, together with the description, disclose the principles of the invention.

DETAILED DESCRIPTION OF THE INVENTION

Figure 1:
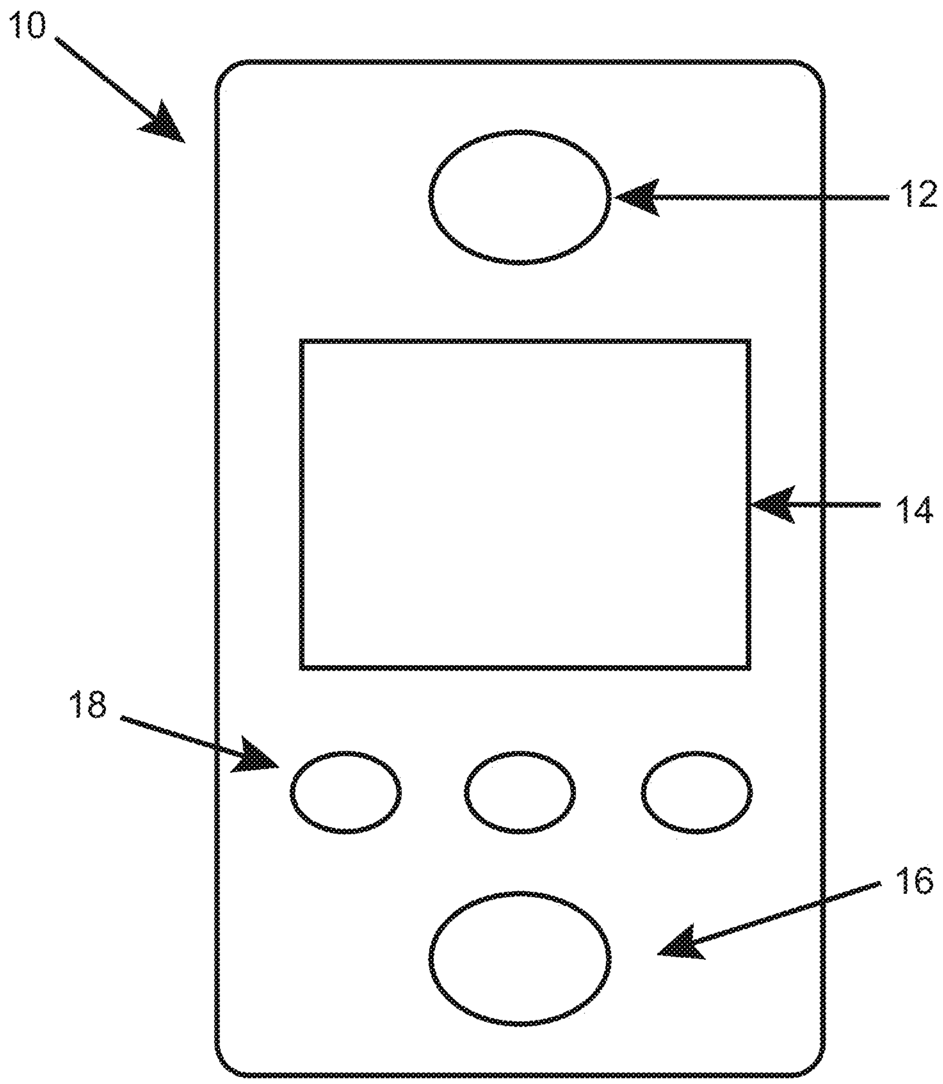
FIG. 1 is a front view of a Decibel Level Detecting Device.

This invention is directed to a decibel alarm feature for security systems as well as an article of intermediate manufacture with the following parameters: greater than 70 dB, sustained for five seconds or longer and sensitivity adjustable by the user.

The user can adjust the sensitivity to make it more or less sensitive: in the case of the system being in a very busy big city, the decibel level which creates a detected event may be increased by user. In the event the system is in a rural area, the decibel level may be reduced by the user. Likewise, the length of time the decibel level indicated is sustained may be increased or reduced to make the system less or more sensitive, for example, heightened decibel level sustained for 5 seconds or longer. In one embodiment, the user can increase or decrease the threshold from 5 seconds in increments of 1 sec up to a maximum of 90+ seconds. Accordingly, if an ambulance or police car is driving by with the sirens on, the user may wish to adjust the sensitivity such that a passing ambulance does not set off the alarm. The time it takes for an ambulance to pass a specific location varies from place to place due to gridlock in bumper to bumper traffic versus a location on a rural two-lane highway.

The whole purpose of the decibel level sensing feature is to cause security systems to become more effective with fewer false alarms caused by various events such as a spider crawling across the camera, branches blowing around in the wind, etc.

Every location can have its own unique "after hours" ambient noise level or its own unique ambient noise level during the time the security system is turned on to a monitoring/active mode.

For example, an individual renting a storage space may have the alarm set to monitoring 24 hours.

The system detecting a sustained decibel level during the time in which the alarm system is active and that system being customizable by the end-user creates a more reliable and effective security system with fewer false alarms.

The Decibel Level Detector (dBA) Component/Feature for Security Systems utilized to detect security breaches, probable theft attempts of vehicles, equipment, etc. based on sensing an elevated decibel level or louder sound level than the normal "After Hours" or "Ambient" decibel level of the monitored area. The elevated decibel level must also have a prolonged duration designated at set up, usually 2 seconds or longer, triggering a security breach which invokes notifications to the designated devices. The "Ambient Decibel Level" ("A") is defined as the "normal" decibel level of the monitored area "after hours", during the hours in which the area is being monitored, for deviations above the customary decibel level during that same time range identified.

Examples of average decibel dBA levels for some common construction site equipment or vehicles about 50 feet from the source are: dump truck 88.8, excavator 87, dozer 85, service truck 90-100, air compressor 81, and loader 76.

At the time of "Set Up", the following items are identified by area to be monitored by placement of the appropriate module either local or remote, and connection to network that is wired, wireless or remote GPS. The time frame to be monitored such as from 5:00 pm to 7:00 am on weekdays and weekends from Friday at 5:00 pm to Monday morning at 7:00 am can be set by the user. This time frame is customizable by day and hour range. Input "A", the "Ambient" decibel level by area, for example inside office areas, outside office areas, parking lots, etc. and remote areas connected via GPS remote modules at job sites allow the system to take a reading of the ambient decibel level during the timeframe being monitored. Input "B" is the deviation above the "Ambient" decibel level in dBA's (e.g.: 5+ dB) which triggers a security breach or probable theft attempt. input "C" is the duration/prolonged time period of "B" the elevated decibel level identified which triggers a security breach or probable theft attempt. The system is capable of storing the ambient decibel level of each monitored area at the time the system is set up and each time it is activated causing the device to become more reliable over time. The device maintains the average hourly dBA over the monitored time period and overall average for the monitored time period with weekly, monthly and annual average ambient dBA levels retained and utilized to generate a more accurate ambient decibel level for the monitored area. When a security breach occurs, video recording is invoked and alert notifications are sent wirelessly to the specified devices/systems such as email, text, installed security system, police, or owner. This feature may also be incorporated with existing security systems.

By way of example, for a job site, "the monitored period of time" would be after working hours Monday through Thursday from 6 pm to 7 am and over the weekend from Friday at 5:00 pm to Monday morning at 7:00 am with an increased decibel level of 20+ dBA with a 90 second duration. Utilizing these default settings, if a diesel truck is cranked up with a level of 80+ dBA or an excavator is cranked up with a level of 87+ dBA, the decibel level detector would trigger a security breach and send an alert to the indicated recipients such as email, text, security system, police, etc. and automatically invokes event video recording as long as the heightened decibel level is maintained plus a preset buffer of 90+ seconds after the site returns to the ambient decibel level. The system can be set up to sound an alarm, siren or flashing light to deter theft. The decibel level detector device is wireless and Bluetooth capable with an app for set up.

It is well known that theft is at an all-time high. Thieves have learned how to outsmart security systems and even tracking devices. By the time the owner can locate the last ping from a tracking device, the stolen item(s) is already on a container on the ocean or across state lines. This results in a costly insurance claim and an increase in premiums along with the excessive replacement cost of the stolen items which will not likely be covered by even the best replacement policy. Even if it is covered, the victim of the theft incurs exorbitant increases in the insurance rates. It is, therefore, imperative to prevent the theft which the decibel level detector can accomplish. Therefore, there exists a need for a solution which can detect a theft in progress. A device which can provide a means to detect a security breach by means of detecting an increase in the decibel level over a defined prolonged time period at a monitored area invoking sirens, videotaping of the area and notifications to the identified recipients which can help stop the theft of items and capture those responsible for the attempted theft. This can be an optional feature which may be incorporated in any existing security system.

This invention is directed to providing for a means to detect a preset dBA increase over the preset ambient decibel level over a prolonged period of time in the monitored area indicating a probable security breach such as vehicles or equipment being cranked or present at a time when they should not be. The measurement of a preset increase and duration in the decibel level invokes notifications, sirens and the video taping of the area in order to deter the theft. This invention may be an option added to any existing security system as an article of intermediate manufacture.

FIG. 1 shows a front view of a decibel level detector component 10 with a camera 12, a led screen 14, a decibel level sensor 16 and a button 18 for settings or to read ambient decibel level at time of setup.

Figure 2:
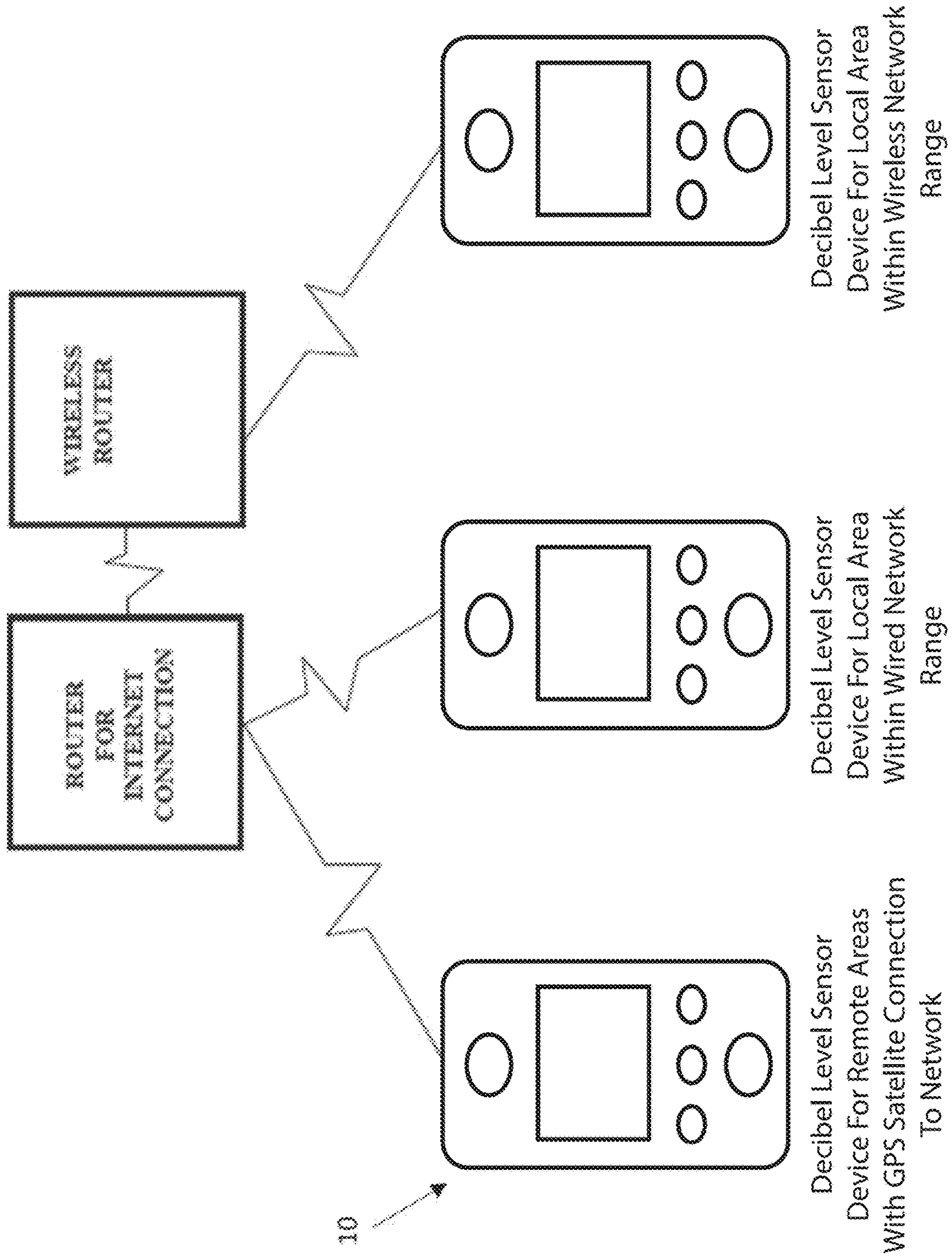
FIG. 2 illustrates the components of Decibel Level Sensor Module.

FIG. 2 shows exemplary setup options for a decibel level detector component 10. The component 10 can be used with a router for internet connection for remote areas with GPS satellite connection to network or for local area within wired network range. Alternatively, the component 10 can be used with a wireless router for local area within wireless network range.

Figure 3:
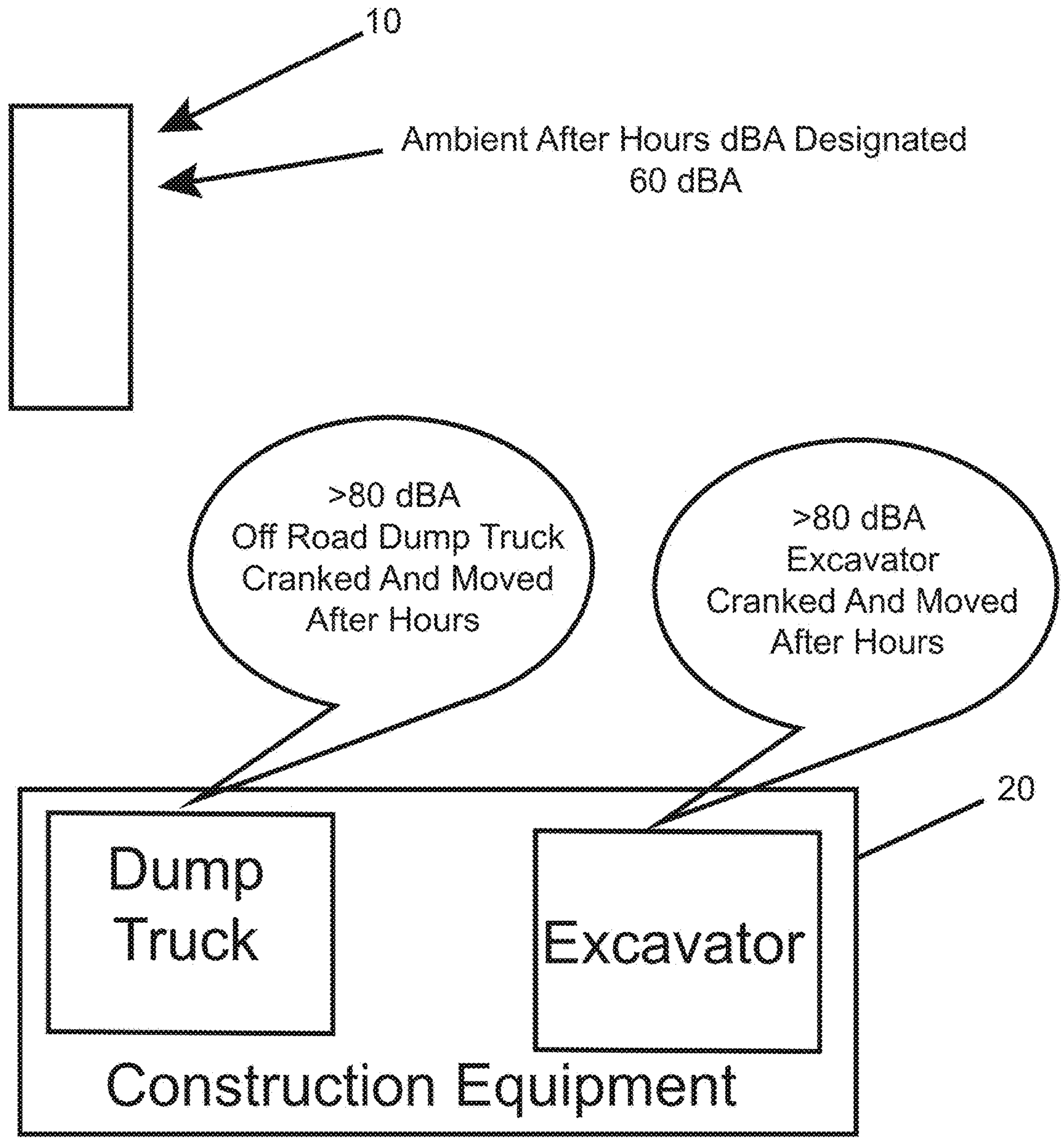
FIG. 3 shows an exemplary Remote Monitored Site as a construction site embodiment system.

FIG. 3 is an exemplary construction site area with construction equipment 20 equipped with remote GPS satellite module and a decibel level detector component or sensor 10. The figure shows the ambient after hours dBA designated at 60 dBA. The equipment would register greater than 80 dBA if an off road dump truck or excavator were cranked and moved after hours.

Figure 4:
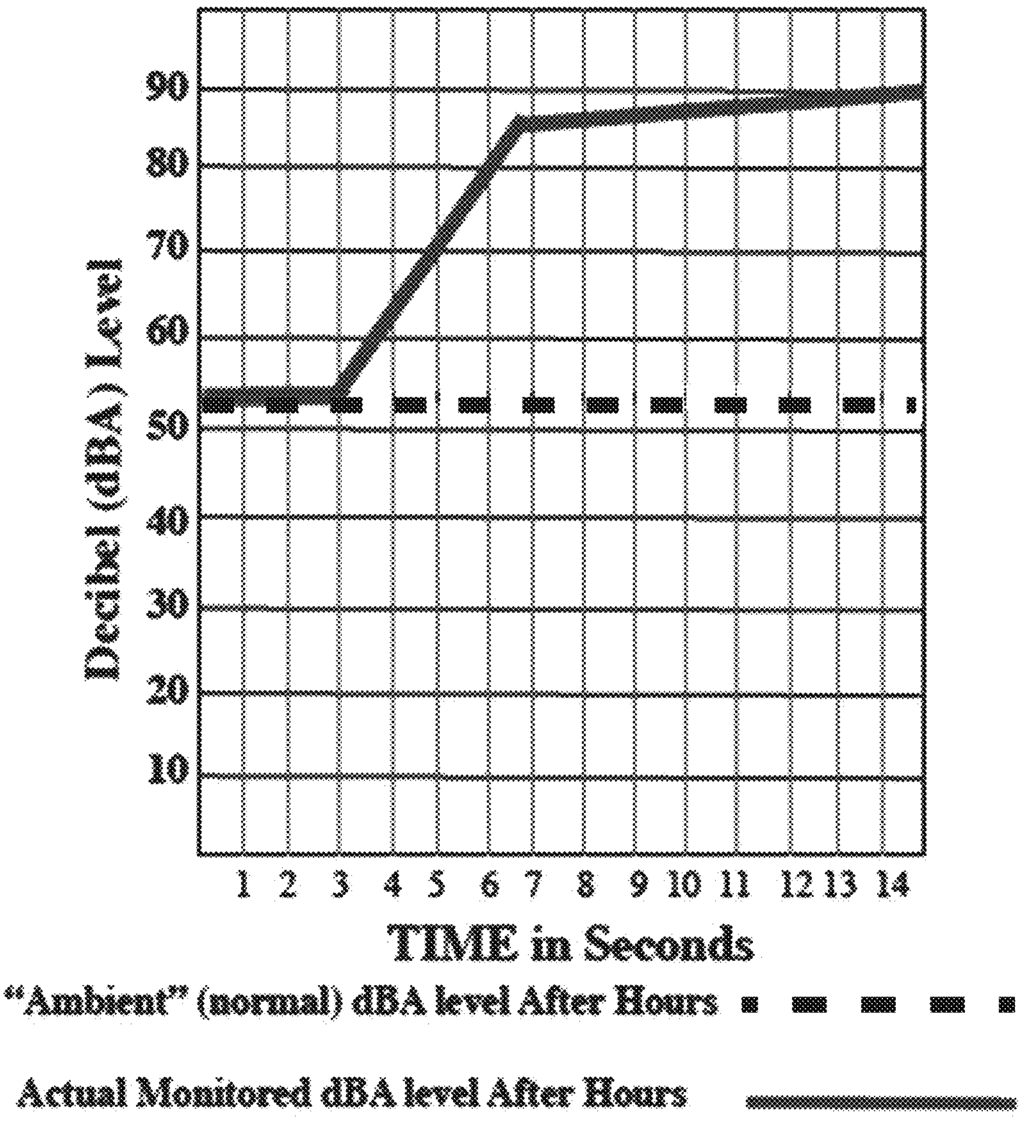
FIG. 4. is a graph showing decibel level exceeded ambient levels for more than 2 seconds.

FIG. 4 is a graph showing an event identified of a dBA level that has exceeded ambient for more than 2 seconds. The remote module sounds an alarm or siren and sends GPS notification to designated recipients.

Figure 5:
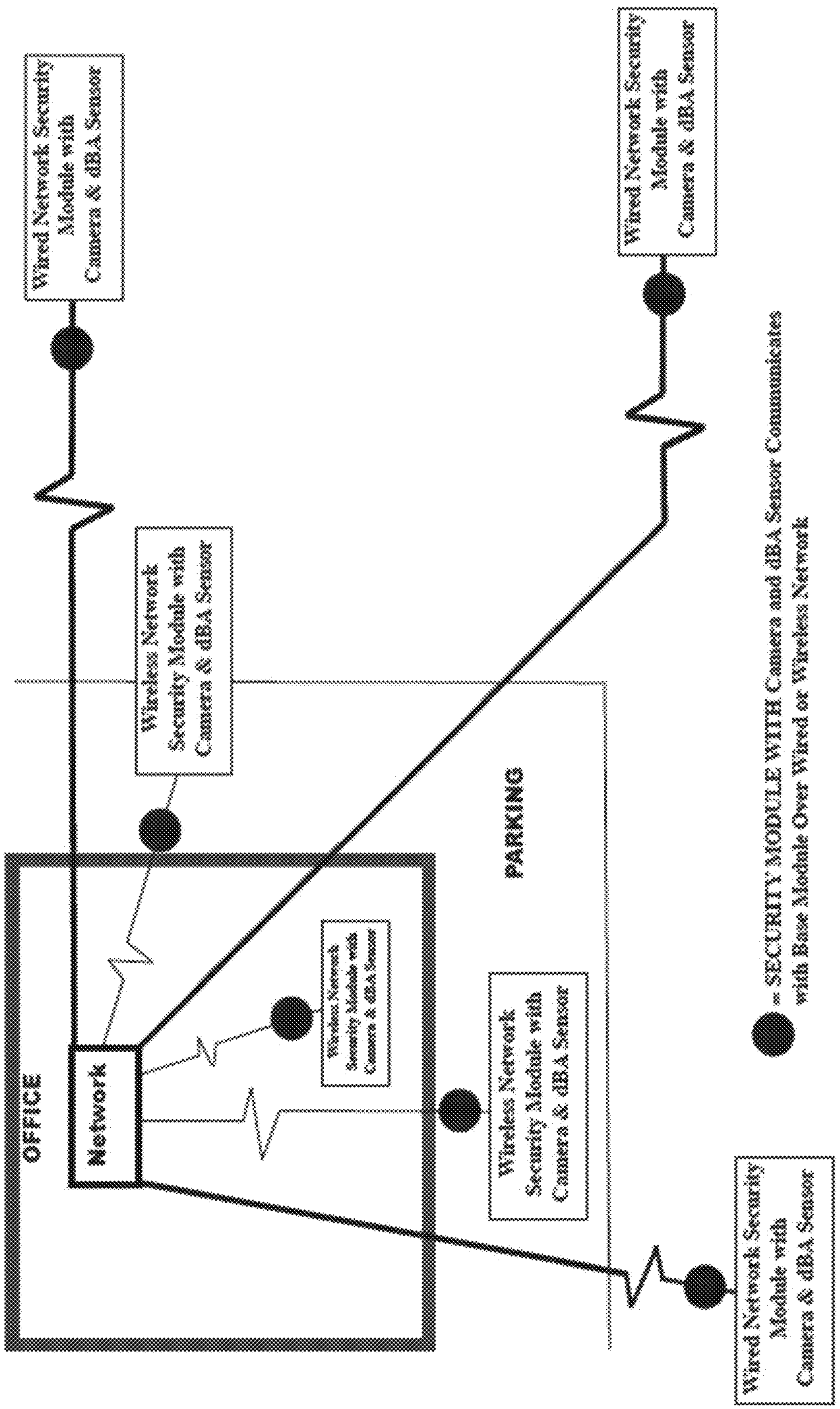
FIG. 5 is a depiction of an arial view of the area in and around the Local Area Network.

FIG. 5 is a schematic of an arial view of an area in and around a local network area including office, parking, outbuildings, equipment, etc.

Figure 6:
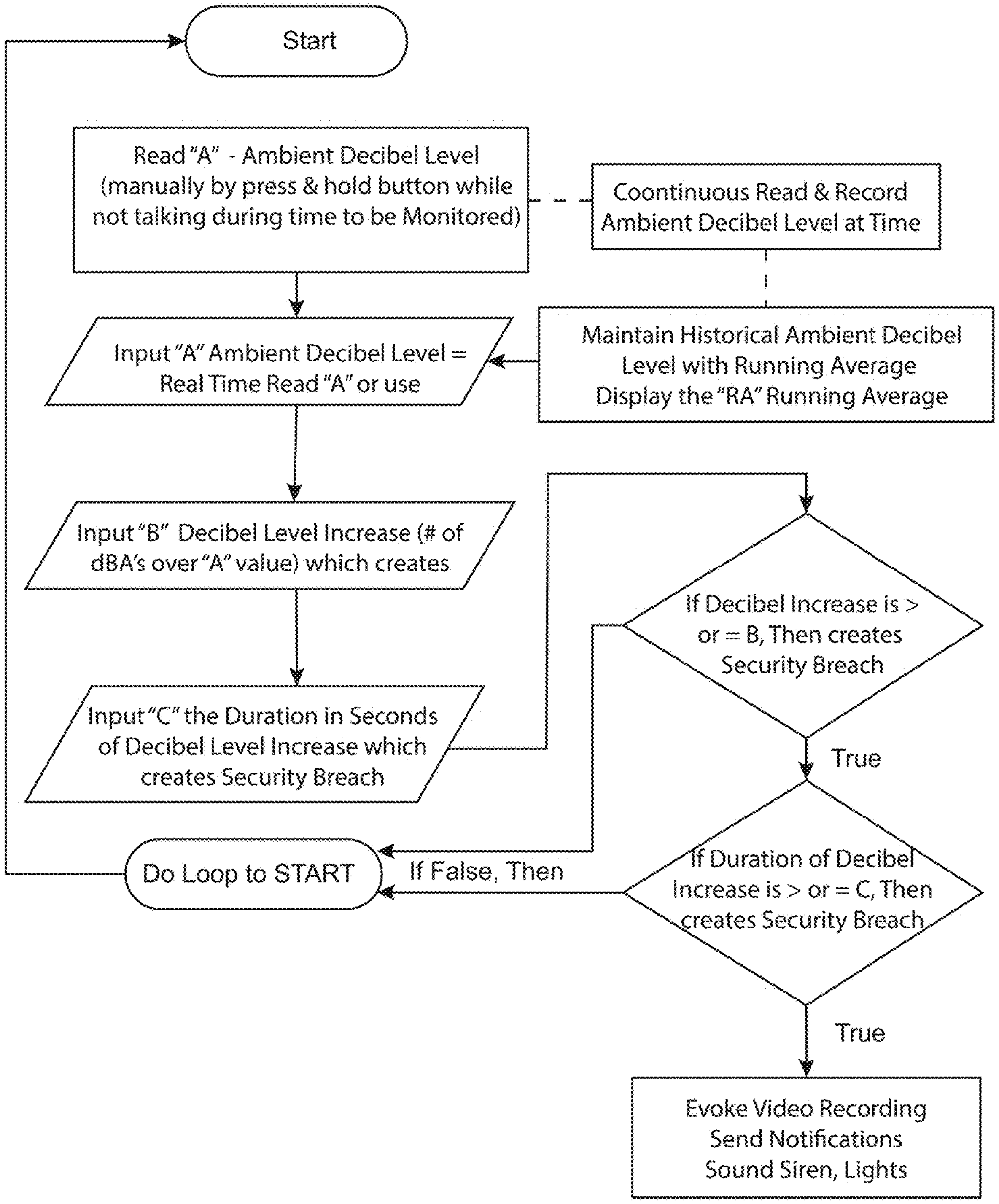
FIG. 6 is a flow chart of Decibel Level Sensor Software.

FIG. 6 is a flow chart of decibel level sensor software.

Figure 7:
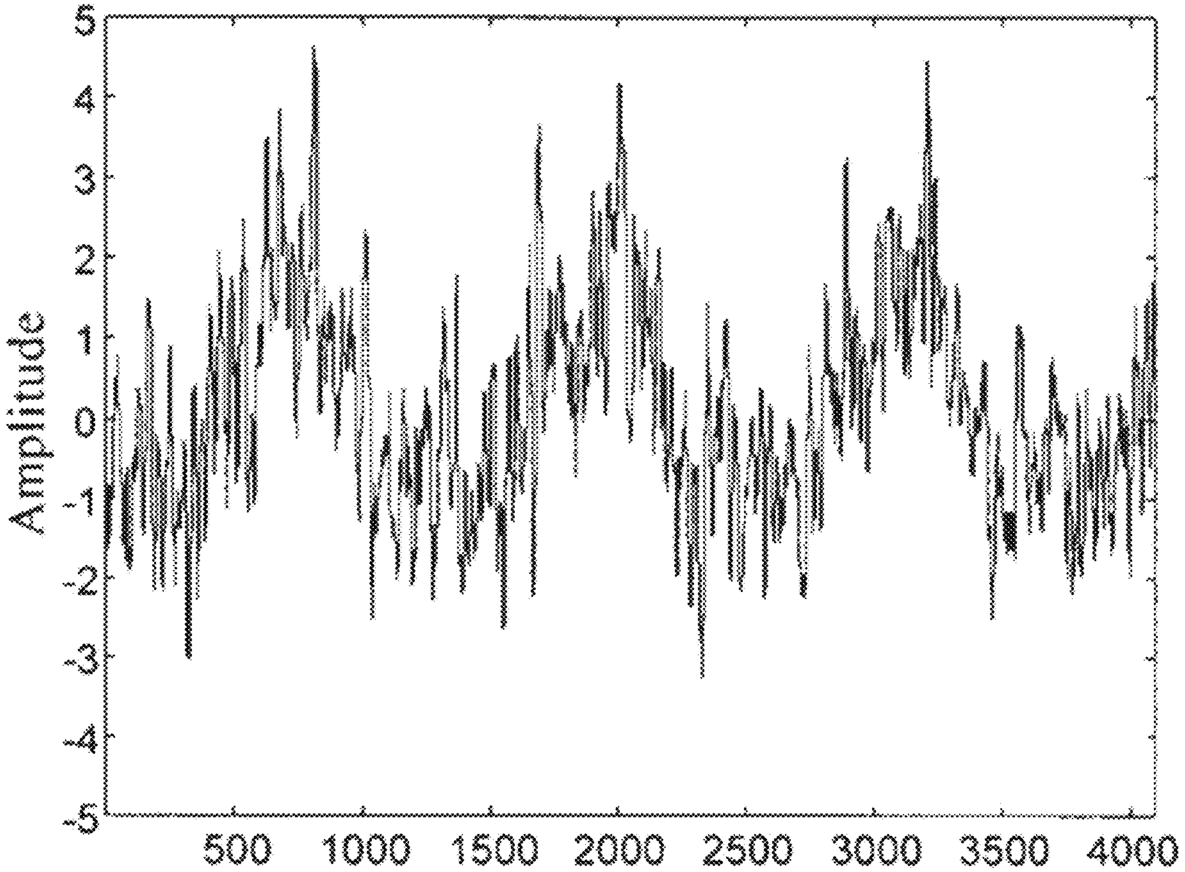
FIG. 7 is a graph showing an exemplary sound signature for a diesel engine.

FIG. 7 is a graph showing an exemplary acoustic signal or signature of a diesel engine. With regard to FIG. 7, it is contemplated that a sound recognition feature can be included. The running diesel engine, for example, has a unique sound signature pattern for each vehicle. Accordingly, each vehicle on a site can have this specific sound signature recorded and stored in the alarm system. When that engine is started and running, the system detector will be set off and will be able to identify the actual vehicle that is running based on the sound signature. This feature is important when the secured vehicles are spread about the site and there are many vehicles being stored. With this sound recognition feature, if a particular vehicle is identified, the system can provide the exact location on site and direct security measures to be taken. One example would be to automatically turn that vehicle's lights on to enable security to go directly to that vehicle. This eliminates the guess work as to where and what vehicle is being stolen. Thieves can move vehicles quickly so this feature of specific vehicle sound recognition means response times can be greatly improved.

The foregoing is provided for purposes of illustrating, explaining, and describing embodiments of this invention. Modifications and adaptations to these embodiments will be apparent to those skilled in the art and may be made without departing from the scope or spirit of this invention.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. An alarm system, comprising:

a networking device connected to the internet; and a plurality of detection devices each connected to the networking device for enabling the communication of security alert notification to a notification recipient device via the internet;

wherein each of the detection devices is associated with a respective monitored area;

wherein each of the detection devices includes a sound sensor and a set of instructions configured to be performed for instantiating a security assessment using sound information provided by the sound sensor;

wherein the set of instructions being configured for instantiating the security assessment as a function of the sound information provided by the sound sensor instructions includes the set of instructions being configured to cause a respective one of the detection devices to:

maintain a record of a location thereof;

maintain, for each of one or more machines within a monitored area of the respective one of the detection devices during a first prescribed period of time within which each of the one or more machines is in a non-operating state, a record of an emitted sound generated during at least a portion of operation by each one of one or more machines;

monitor, via the sound sensor thereof during each of the plurality of instances of the first prescribed period of time, ambient sound within the monitored area thereof;

determine, after completion of a current one of the plurality of instances of the prescribed first period of time, a baseline ambient sound level as a function of said ambient sound monitored during each one of a plurality of prior ones of the instances of the prescribed first period of time;

maintain a record of the baseline ambient sound level after each instance of the baseline ambient sound level being determined;

maintain a record of a prescribed sound level increase amount;

determine if the ambient sound monitored during the current one of the plurality of instances of the prescribed first period of time includes the emitted sound of at least one of the one or more machines;

determine if a level of the ambient sound level within the area during the current one of the instances of the prescribed first period of time is over the baseline ambient sound level by an amount at least equal to the prescribed sound level increase amount for at least a prescribed trigger delay time; and send the security alert notification via the networking device to the notification recipient device in response to:

determination that the ambient sound monitored during the current one of the plurality of instances of the prescribed first period of time includes the emitted sound of at least one of the one or more machines; and/or determination that a level of the ambient sound level within the monitored area during the current one of the instances of the prescribed first period of time is over the baseline ambient sound level by an amount at least equal to the prescribed sound level increase amount for at least a prescribed trigger delay time.

2. The alarm system of claim 1, wherein the set of instructions are further configured to cause the detection device to enable the prescribed sound level increase amount to be selectively adjusted between a plurality of pre-defined sound level increase amounts.

3. The alarm system of claim 1, wherein the set of instructions is further configured to cause the detection device to enable the prescribed trigger delay time to be selectively adjusted between a plurality of pre-defined trigger delay times.

4. The alarm system of claim 3, wherein the set of instructions is further configured to cause the detection device to enable the prescribed sound level threshold amount to be selectively adjusted between a plurality of pre-defined sound level threshold amounts.

5. The alarm system of claim 1, wherein the set of instructions being further configured to determine the baseline sound level includes the set of instructions being further configured to:

determine a plurality of average sound levels for each of a respective one of the plurality of instances of the prescribed first period of time; and determine the baseline sound level as a function of at least two of the average sound levels.

6. The alarm system of claim 5, wherein the set of instructions is further configured to cause the detection device to enable the prescribed sound level increase amount to be selectively adjusted between a plurality of pre-defined sound level increase amounts.

7. The alarm system of claim 5, wherein the set of instructions is further configured to cause the detection device to enable the prescribed trigger delay time to be selectively adjusted between a plurality of pre-defined trigger delay times.

8. The alarm system of claim 7, wherein the set of instructions is further configured to cause the detection device to enable the prescribed sound level increase amount to be selectively adjusted between a plurality of pre-defined sound level increase amounts.

9. The alarm system of claim 1, wherein:

the set of instructions being configured to cause the detection device to determine the baseline sound level includes the set of instructions being configured to cause the detection device to determine a plurality of first average sound levels for each of a respective one of the plurality of instances of the prescribed first period of time and being operable to determine a plurality of second average sound levels for each of a respective one of the plurality of instances of a second period of time longer than the first period of time;

wherein the prescribed first period of time is less than 24 hours;

wherein the prescribed second period of time is a length of time greater than two of the prescribed first period of time; and wherein being operable to determine the baseline sound level as a function of the ambient sound level includes being operable to determine the baseline sound level as a function of at least two of the second average sound levels.

10. The alarm system of claim 9, wherein the set of instructions is further configured to cause the detection device to enable the prescribed sound level increase amount to be selectively adjusted between a plurality of pre-defined sound level increase amounts.

11. The alarm system of claim 9, wherein the set of instructions is further configured to cause the detection device to enable the prescribed trigger delay time to be selectively adjusted between a plurality of pre-defined trigger delay times.

12. The alarm system of claim 11, wherein the set of instructions is further configured to cause the detection device to enable the prescribed sound level increase amount to be selectively adjusted between a plurality of pre-defined sound level increase amounts.

13. The alarm system of claim 1, wherein the set of instructions being configured to cause the respective one of the detection devices to send the security alert notification includes the set of instructions being configured to cause the respective one of the detection devices to send the security alert notification in response to the ambient sound monitored during the current one of the plurality of instances of the prescribed first period of time including the emitted sound of at least one of the one or more machines.

14. The alarm system of claim 13, wherein the security alert notification includes the location of the respective one of the detection devices and identification a respective one of the one or more machines that corresponds to the emitted sound.

15. The alarm system of claim 13, wherein the security alert notification includes the location of the respective one of the detection devices.

16. The alarm system of claim 1, wherein the set of instructions being configured to cause the respective one of the detection devices to send the security alert notification includes the set of instructions being configured to cause the respective one of the detection devices to send the security alert notification in response to determination that a level of the ambient sound level within the monitored area during the current one of the instances of the prescribed first period of time is over the baseline ambient sound level by an amount at least equal to the prescribed sound level increase amount for at least a prescribed trigger delay time.

17. The alarm system of claim 16, wherein the security alert notification includes the location of the respective one of the detection devices.

18. The alarm system of claim 1, wherein:

each of the one or more machines includes an engine that generates the emitted sound thereof;

the record of the emitted sound for each of the one or more machines includes the sound of the engine of a respective one of the machines running;

the set of instructions being configured to cause the respective one of the detection devices to send the security alert notification includes the set of instructions being configured to cause the respective one of the detection devices to send the security alert notification in response to the ambient sound monitored during the current one of the plurality of instances of the prescribed first period of time including the ambient sound including the sound of the engine of a respective one of the machines running.

* * * * *